US010127503B2

(12) United States Patent
Hladik, Jr.

(10) Patent No.: US 10,127,503 B2
(45) Date of Patent: Nov. 13, 2018

(54) GENERATING MULTIDIMENSIONAL COMBINATION DATA

(71) Applicant: International Business Machines Corporation, Armonk, NY (US)

(72) Inventor: William J. Hladik, Jr., Harrisburg, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 14/918,997

(22) Filed: Oct. 21, 2015

(65) Prior Publication Data

US 2017/0116304 A1 Apr. 27, 2017

(51) Int. Cl.
*G06F 17/30* (2006.01)
*G06Q 10/06* (2012.01)
*G06Q 30/00* (2012.01)
*G06Q 30/02* (2012.01)

(52) U.S. Cl.
CPC ............. *G06Q 10/06* (2013.01); *G06Q 30/00* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,028,046 B2 * | 4/2006 | Anjur | G06F 17/30592 |
| 7,194,483 B1 * | 3/2007 | Mohan | G06F 17/3061 |
| | | | 707/600 |
| 7,797,320 B2 * | 9/2010 | Thomsen | G06F 17/30536 |
| | | | 707/737 |
| 7,971,180 B2 | 6/2011 | Kreamer et al. | |
| 8,612,421 B2 | 12/2013 | Dombroski et al. | |
| 2002/0091707 A1 * | 7/2002 | Keller | G06F 17/3061 |
| 2007/0036431 A1 * | 2/2007 | Terakawa | G06K 9/00248 |
| | | | 382/170 |
| 2010/0131457 A1 * | 5/2010 | Heimendinger | G06F 17/30592 |
| | | | 707/602 |

(Continued)

OTHER PUBLICATIONS

IBM, A Method and Apparatus for Exploration of Hyper dimensional Data, Dec. 2, 2014.

*Primary Examiner* — Hung Le
(74) *Attorney, Agent, or Firm* — Carg Law Firm, PLLC; Christopher K. McLane

(57) ABSTRACT

A set of available values is obtained corresponding to a set of data fields associated with a dimension member in a set of dimension members corresponding to a dimension in a set of dimensions of an object. Each possible combination of dimension members is computed for the object. For a data field of a dimension member of a dimension, a normalized value is computed based on values of the data field for each dimension member in the dimension. A combined data field value is computed for a possible combination of the object as a product of the normalized value of the data field in each dimension member that participates in the possible combination. A set of combined data field values corresponding to all possible combinations is analyzed to identify a possible combination having a property. A control component of a physical environment is adjusted according to the identified possible combination.

20 Claims, 5 Drawing Sheets

(56) References Cited

U.S. PATENT DOCUMENTS

| | | | |
|---|---|---|---|
| 2010/0228918 A1* | 9/2010 | Vorbach | G06F 8/433 |
| | | | 711/118 |
| 2010/0235294 A1* | 9/2010 | Raghupathy | G06Q 10/04 |
| | | | 705/342 |
| 2013/0066675 A1 | 3/2013 | Bercaw | |
| 2013/0138601 A1* | 5/2013 | Mahalanabis | G06F 17/30563 |
| | | | 707/602 |
| 2013/0275816 A1* | 10/2013 | Bernstein | G06F 11/0754 |
| | | | 714/48 |
| 2014/0172827 A1* | 6/2014 | Nos | G06F 17/30424 |
| | | | 707/722 |
| 2016/0173468 A1* | 6/2016 | Fischer | H04L 63/08 |
| | | | 726/6 |

\* cited by examiner

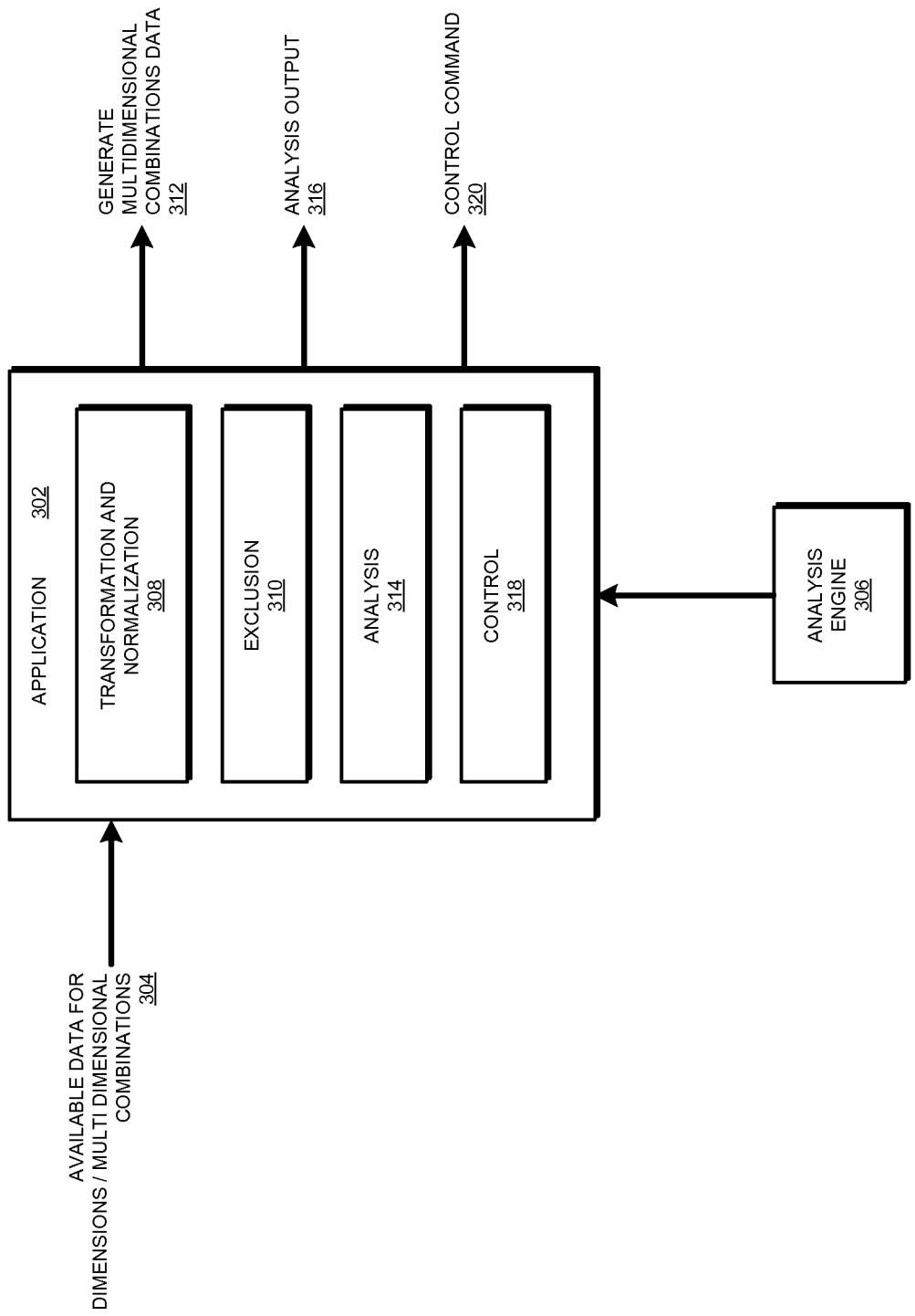

| DIMENSION | DIMENSION VALUE | SALES | PREFERENCE |
|---|---|---|---|
| SIZE (404) | SMALL | 4 | 37.00% |
|  | MEDIUM | 10 | 50.00% |
|  | LARGE | 25 | 22.00% |
| COLOR (406) | RED | 1000 | 4 |
|  | BLUE | 4000 | 4 |
|  | GREEN | 10000 | 6 |
|  | ORANGE | 500 | 10 |
| MEMORY (408) | 16GB | 0.75 | 85.00% |
|  | 32GB | 1 | 15.00% |

452

| DIMENSION | DIMENSION VALUE | SALES | PREFERENCE |
|---|---|---|---|
| SIZE (454) | SMALL | 10.26% | 33.94% |
|  | MEDIUM | 25.64% | 45.87% |
|  | LARGE | 64.10% | 20.18% |
| COLOR (456) | RED | 6.45% | 16.67% |
|  | BLUE | 25.81% | 16.67% |
|  | GREEN | 64.52% | 25.00% |
|  | ORANGE | 3.23% | 41.67% |
| MEMORY (458) | 16GB | 10.71% | 21.25% |
|  | 32GB | 14.29% | 3.75% |
|  | NONE | 75.00% | 75.00% |

460

472

| SIZE | COLOR | MEMORY | SALES | PREFERENCE |
|---|---|---|---|---|
| LARGE | BLUE | 16GB | 1.77% | 0.71% |
| LARGE | BLUE | 32GB | 2.36% | 0.13% |
| LARGE | BLUE | NONE | 12.41% | 2.52% |
| LARGE | GREEN | 16GB | 4.43% | 1.07% |
| LARGE | GREEN | 32GB | 5.91% | 0.19% |
| LARGE | GREEN | NONE | 31.02% | 3.78% |
| LARGE | ORANGE | 16GB | 0.22% | 1.79% |
| LARGE | ORANGE | 32GB | 0.30% | 0.32% |
| LARGE | ORANGE | NONE | 1.55% | 6.31% |
| LARGE | RED | 16GB | 0.44% | 0.71% |
| LARGE | RED | 32GB | 0.59% | 0.13% |
| LARGE | RED | NONE | 3.10% | 2.52% |
| MEDIUM | BLUE | 16GB | 0.71% | 1.62% |
| MEDIUM | BLUE | 32GB |  |  |
| MEDIUM | BLUE | NONE |  |  |
| MEDIUM | GREEN |  |  |  |

GENERATING MULTIDIMENSIONAL COMBINATION DATA

TECHNICAL FIELD

The present invention relates generally to a method, system, and computer program product for filling gaps in collected data. More particularly, the present invention relates to a method, system, and computer program product for generating multidimensional combination data.

BACKGROUND

Objects in many subject matter areas are related to each other in many different ways. For example, a server space involves an operating system, a server hardware platform, a virtualization hypervisor, a data center environment, a clustering solution, or some combination of these and other features. For example, a data processing system is related to an operating system and a type of hardware; and a type of hardware is related to a type of processor, a hypervisor, a data processing environment, and a cluster. A hypervisor can be of various types; a data processing environment can be of various configurations; and a cluster can use any of the various clustering solutions.

As another example, a phone can be of different sizes. A phone can also be of different colors. A phone can also have different configurations of memory and other features.

A dimension is a feature or another object to which an object is related, on which the object depends, or which describes all or a part of the object. For example, when the object is a server space, the operating system executing in that server space, the hardware platform deployed in that server space, the hypervisor in use with that server space, the clustering solution in use with that server space, and the type of data processing environment in which that server space participates are each a dimension of the server space. Similarly, when a phone is the object, the size, the color, and the memory of the phone are each a dimension of the phone.

A dimension can have dimension members. For example, the dimension members of an operating system dimension can be the specific operating systems that can be used. Accordingly, for a server space object, Windows™, AIX™ Linux™, PowerLinux™, Solaris™, HP-UX™ and zLinux™ are some example dimension members of a dimension that is the operating system (the trademarks are the property of their respective owners). Similarly, Intel™, zSeries™, PureAS™, Cisco UCS™, VCE vBlock™, and PureFlex™ are some example dimension members of a dimension that is the hardware platform (the trademarks are the property of their respective owners). Similarly, VMware™, PowerVM™, PowerKVM™, KVM™, Hyper RHEV™, Xenserver™, Z/VM™ and others are some example dimension members of a dimension that is the hypervisor (the trademarks are the property of their respective owners). MSCS™, Veritas™, Power HA™, and Oracle RAC™ are some example dimension members of a dimension that is the clustering solution (the trademarks are the property of their respective owners). Similarly, public cloud, private cloud, CMS™ and Softlayer™ are some example dimension members of a dimension that is the data processing environment (the trademarks are the property of their respective owners).

In a like manner, a phone object can have small, medium, and large as some example dimension members for the dimension that is the size of the phone. Red, blue, green, and orange can be some example dimension members for the dimension that is the color of the phone. 16 Gigabytes (GB), and 32 GB can be some example dimension members for the dimension that is the memory or storage space in the phone.

SUMMARY

The illustrative embodiments provide a method, system, and computer program product for generating multidimensional combination data. An embodiment includes a method. The embodiment obtains a set of available values corresponding to a set of data fields, the set of data fields being associated with a dimension member in a set of dimension members, the set of dimension members corresponding to a dimension in a set of dimensions of an object. The embodiment computes, using a processor and a memory, each possible combination of dimension members for the object. The embodiment computes, for a data field in the set of data fields of a dimension member in the set of dimension members of a dimension in the set of dimensions, a normalized value based on values of the data field for each dimension member in the dimension. The embodiment computes a combined data field value for a possible combination of the object, wherein the combined data field value is a product of the normalized value of the data field in each dimension member that participates in the possible combination. The embodiment analyzes a set of combined data field values corresponding to all possible combinations, to identify a possible combination having a property. The embodiment adjusts a control component of a physical environment according to the identified possible combination having the property.

Another embodiment includes a computer program product comprising one or more computer-readable storage devices, and program instructions stored on at least one of the one or more storage devices.

Another embodiment includes a computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example application for generating multidimensional combination data in accordance with an illustrative embodiment;

FIG. 4 depicts an example phase in generating multidimensional combination data in accordance with an illustrative embodiment.

DETAILED DESCRIPTION

Figure 1:
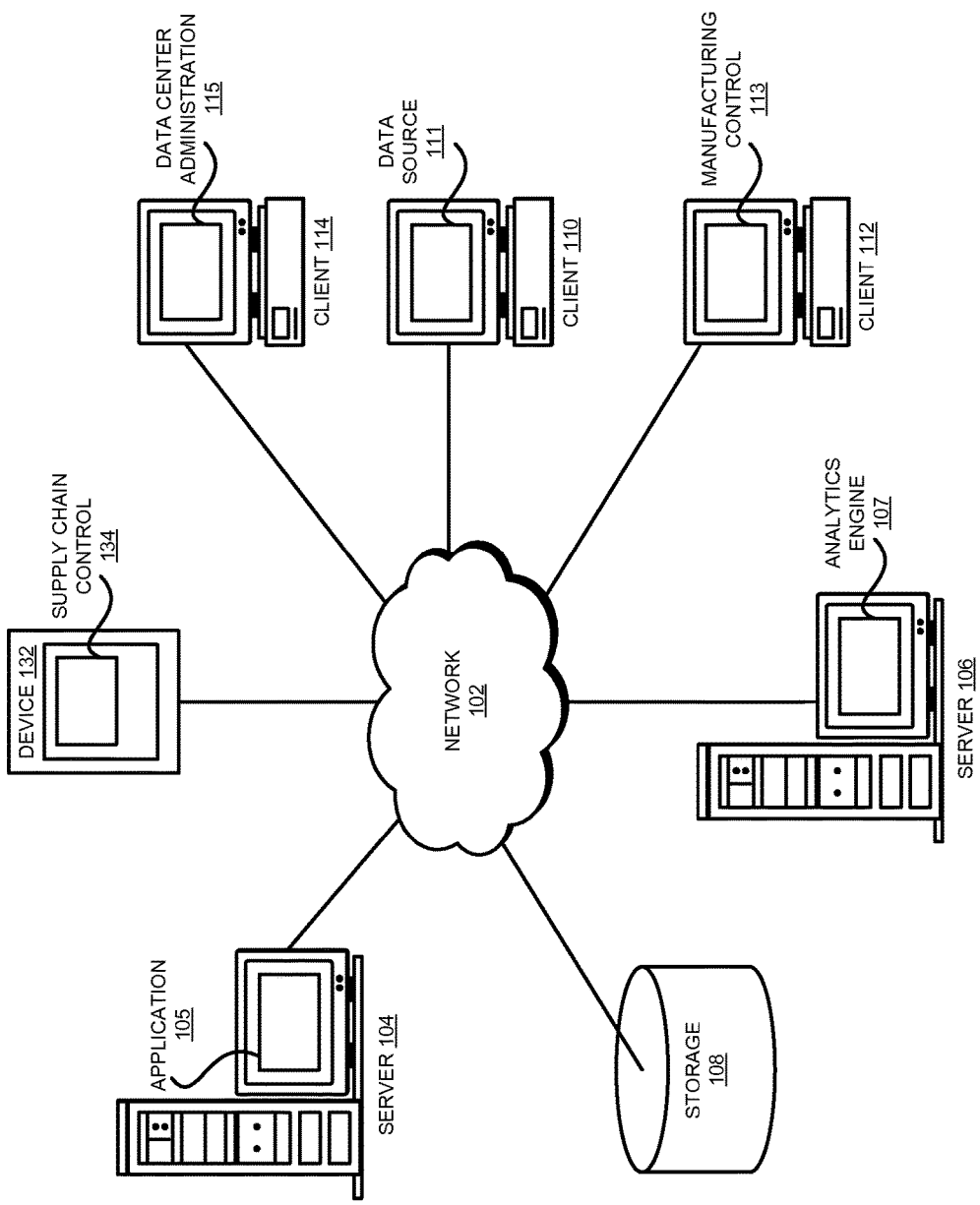
FIG. 1 depicts a block diagram of a network of data processing systems in which illustrative embodiments may be implemented.

Consider a server operating in a server space. Temporarily ignoring any configuring restrictions, any given server instance can be executing potentially any operating system on any hardware platform in any data processing environment. The server may also be hosted by any hypervisor and may be managed by any clustering solution. There, of course, can be many other dimensions and dimension members that are applicable to the server instance.

Generally, if there are x dimensions and each dimension has y dimension members, then the possible number of combinations in which an object can be related to the dimensions is $(y)^x$. The illustrative embodiments recognize that the dimensionality of such relationship data can quickly become extremely large. For example, just 3 dimensions each having 4 dimension members produces 4*4*4=64 possible combinations. Thus, when the object is a server space, given 6 possible operating systems, 7 possible hardware platforms, 8 possible hypervisors, 4 possible clustering solutions, and 4 possible data processing environments that can be configured for that server space results in 6*7*8*4*4=5376 possibilities.

The illustrative embodiments recognize that given such rapid increase in the numbers, which configuration to use/deploy/recommend/remove/disregard is a difficult question to answer in a datacenter. Similarly, with the phone object, which size, color, and memory configuration to produce/source/market/supply/procure/remove/discontinue is a difficult question to answer in a manufacturing or supply chain environment.

The illustrative embodiments recognize that each dimension member has one or more data values in the corresponding one or more data fields. For example, while six different operating systems may be available as options, not all of them are suitable or desirable in a given server space depending on the workload, customer, preferences, policies, and many other factors. For example a data value might be available representing the number of users that prefer a given operating system. Following this example, 57 users might prefer Windows (dimension member Window has value 57). Similarly, Linux might be preferred in 17 instances, PowerLinux in 1 case, AIX by 15 users, Solaris in 4 circumstances, HP-UX in 1 case, and zLinux in 2 cases.

Generally, any number of data fields may be associated with a dimension and dimension member. If a data field is available for a particular dimension or dimension member, that data field is available for all dimensions and dimension members in consideration, but may have null or invalid values when that data files is not applicable to or unavailable for a dimension or dimension member. Furthermore, a value in a data field can be numeric or non-numeric, such as alphabetic, alphanumeric, symbolic, or encoded in other ways e.g. by using color codes. Regardless of the type of value stored in a data field, an embodiment can be adapted to convert such value to a numeric value for use in an operation described herein, and such adaptations are contemplated within the scope of the illustrative embodiments.

The illustrative embodiments recognize that data is available from certain data sources about certain combinations of dimensions and dimension members but the data about many dimensional combinations is not available because either the data is not collected at each combination, or many combinations are not even used. For example, user preference data about small blue phones may be available but medium orange phones with 16 GB memory may not be available. A phone manufacturer has no information about medium orange phones with 16 GB memory, unless such a product was actually produced, sold, and its data collected, to determine whether such a product should be manufactured or removed from their offering.

Similarly, a datacenter may have volumes of usage data about Windows servers on Intel Hardware running under the Xen hypervisor in Cloud data centers with Oracle RAC used for clustering. But if an administrator wishes to compare the usage data of this configuration with the usage data of dedicated AIX servers running on PureFlex hardware in private data centers with no clustering solution, the latter data may simply not be available for the comparison.

The illustrative embodiments recognize that the availability of data about multidimensional combinations is usually sparse, with data being available for only some combinations of the dimensions. A need exists for generating logically reasonable data for the missing multidimensional combinations, which might easily number in the thousands. Furthermore, such data has to be based on the available actual data about the actual dimensional combinations.

The illustrative embodiments used to describe the invention generally address and solve the above-described problems and other problems related to the scarcity of data about multidimensional combinations. The illustrative embodiments provide a method, system, and computer program product for generating multidimensional combination data.

An embodiment can be implemented as a software application. The application implementing an embodiment can be configured as a modification of an analytics engine or a control component, as a separate application that operates in conjunction with an existing analytics engine or control component, a standalone application, or some combination thereof.

An analytics engine is a software tool usable for performing a data analysis according to an analytical model or algorithm. A control component is a component that is usable for controlling or configuring a data processing environment, a manufacturing process, a supply chain process, and the like.

Returning to the example comparison that an administrator in a datacenter wishes to perform, presently, the data needed to perform that comparison is unavailable. However, data for some dimension members independently, or in some dimensional combinations, is available. For example, the relative usage of operating systems is available. Data about the relative usage of hypervisors, hardware platforms, data processing environments, and clustering solutions is also available.

Given the available data of certain independent dimensions, certain combinations of certain dimensions, or some combination thereof, an embodiment derives or generates the data for the possible or needed multidimensional combinations. One example consideration in the generation of such data is that certain combinations of dimensions may not be possible or may not be allowed. For example, the operating system dimension of "Windows" may not be combined with the hardware Platform dimension of "Unix". An embodiment has the ability to exclude certain combinations of dimensions from the data generation process.

Another example consideration in the generation of such data is that certain dimensions must be weighted when combined. In the datacenter example, all servers have the dimension of operating system, hardware platform, and the data processing environment, but only some of the servers have the dimension of hypervisor and clustering. One embodiment weights the hypervisor and the clustering dimensions in this example to allow for combinations that have no hypervisor and no clustering. Another embodiment addresses this aspect—where some dimensions apply in some combinations but not all—by defining a dimension member of "None" for such dimensions. The "none" dimension member is used for the dimension in the combination where the dimension does not apply. The embodiment assigns the "none" dimension member a suitable value.

Another example consideration in the generation of such data is that the values of different dimension members may have different baselines. For example, Windows servers may be used 100,000 times and AIX server instances may be 30,000. An embodiment translates such different baseline numbers to a percentage for the dimension in question. For example, if the total server count is 500,000 then Windows servers are 20 percent and AIX servers are 6 percent. Such translation puts each dimension member value on a common baseline of 0 percent-100 percent and allows the embodiment to generate logically accurate data for the various combinations of dimensions.

An embodiment modifies this base-lining process to accommodate exclusions. The percentage value of the dimension combinations that are to be excluded are zeroed. The embodiment then proportionately redistributes the remaining percentages over the 0-100 percent baseline.

When the data of all desired multidimensional combinations has been generated, an embodiment invokes an analytics engine to perform a desired analytical operation on the generated data. An embodiment uses a result of the analytical operation to send a corresponding command to a control component. For example, an embodiment may find that even though medium sized orange phones with 16 GB are not produced or data is not available for that combination, such a multidimensional combination would be preferred by a higher than a threshold percentage of users. Accordingly, the embodiment sends a command to a control component to initiate the manufacturing, or trigger a supply chain, for such a combination.

A method of an embodiment described herein, when implemented to execute on a device or data processing system, comprises substantial advancement of the functionality of that device or data processing system in generating multidimensional combination data. For example, presently available data about multidimensional combinations is limited to only certain combinations of certain dimensions. An embodiment provides a method for generating logically sound and coherent data about other multidimensional combinations from the available data about multidimensional combinations. An embodiment applies one or more analytical techniques to the generated multidimensional combinations data to produce a result of the desired analysis. An embodiment further uses the result of the analysis to send a command to a control component. This manner of generating multidimensional combination data is unavailable in the presently available methods. Thus, a substantial advancement of such devices or data processing systems by executing a method of an embodiment is in enabling a comprehensive analysis of multidimensional combinations regardless of whether actual data is available for such analysis.

The illustrative embodiments are described with respect to certain dimensions, dimension members, values, multi-dimensional combinations, available data, generated data, analytical operations, commands, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
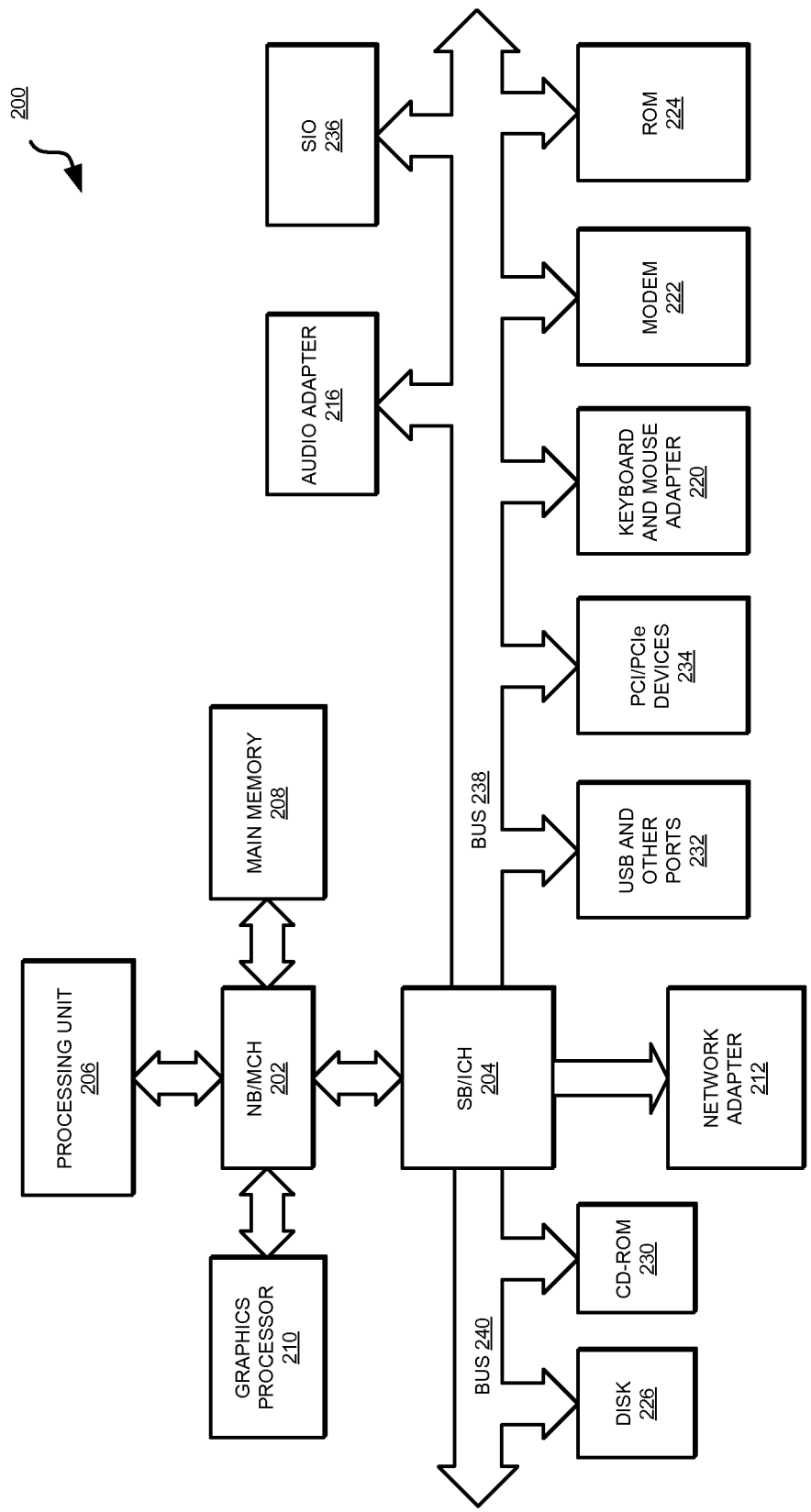
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Data source 111 is a data source, such as a database of survey information, performance information, preference information, usage information, or some combination of these and other similarly purposed data. The data in data source 111 is the available data of some actual multidimensional combinations. Application 105 uses data from data source 111 to generate derived data of other multidimensional combinations. Application 105 uses analytics engine 107 to produce a result of an analytical operation, such as those described herein via certain examples. Application 105 sends a control command, or causes a control command to be sent to one or more control components, such as to manufacturing control 113, datacenter administration 115, or supply chain control 134.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android' (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

With reference to FIG. 3, this figure depicts a block diagram of an example application for generating multidimensional combination data in accordance with an illustrative embodiment. Application 302 is an example of application 105 in FIG. 1. Input 304 is the available data of some dimensions, some multidimensional combinations, or a combination thereof. Input 304 is available from data source 111 in FIG. 1. Analytics engine 306 is an example of analytics engine 107 in FIG. 1.

The operations of FIG. 3 are described using the example of the phone object described earlier. From this disclosure, those of ordinary skill in the art will be able to adapt an embodiment to other objects, dimensions, and multidimensional combinations, and such adaptations are contemplated within the scope of the illustrative embodiments.

With reference to FIG. 4, this figure depicts an example phase in generating multidimensional combination data in accordance with an illustrative embodiment. Table 402 depicts available data from data source 111 for an example phone object. Table 452 depicts transformed and normalized data produced during the process of generating multidimensional combination data described with respect to application 302 herein. A dimension can have more than one value. A dimension member can have more than one value as shown. For example, dimension member "small" of dimension "size" can have a sales value indicating a volume of sales of phone objects having that dimension member, and a preference value indicating a preference for the phone objects having that dimension member.

Component 308 performs a transformation and normalization of input 304. For example, given the three sizes of the phone object in row 404—small, medium, and large, given the four colors of the phone object in row 406—red blue, green, and orange, and given the two memory configurations in row 408—16 GB and 32 GB, component 308 computes all the possible multidimensional combinations.

Assume that some phones are not configured with storage memory. Therefore, component 308 inserts a third memory configuration "none" (not shown), making the number of memory dimension members 3. In this example, component 308 would compute the 3*4*3=36 possible multidimensional combinations for the phone. Some of the possible multidimensional combinations are listed in table 472 in FIG. 4.

Component 308 performs the translation of the raw data inputs from table 402 into relative percentages of table 452. Using the example data in table 402, the input for Sales of Small phones is 4. According to row 404, the total for the entire dimension of Size is 4+10+25=39. Therefore, component 308 computes a transformed and normalized Sales value for dimension member Small as 4/39=10.26%

Similarly, the Preference value for Green dimension member is 6. The total for the dimension of Color according to row 406 is 4+4+6+10=24. Therefore, component 308 computes Preference value of Green dimension member as 6/24=25.00%

Not shown in table 402 is one additional dimension member—None—in dimension Memory. Suppose 75% of phones have no memory or storage space for users. Therefore, component 308 creates a dimension member of "None" (460) and assigns a value 75%. Because 75% of phones do not have memory the sales value of row 408 is representing only the remaining 25% of the phones. In other words, the dimension "memory" has only 25% weight because its actual data accounts for only 25% of the phone objects that do have memory. Generally, if a dimension has a "none" member, the weight of the dimension is 1 minus the value of the None member, or 100% minus the percentage value of the None member.

Component 308 computes the remaining dimension members as:

(Value/Total)*Dimension weight

Using the example values from table 402, the total for the entire dimension of Memory is 0.75+1=1.75 and the weight of the Memory dimension is 25%. Accordingly, the value for Sales dimension member of 16 GB phones is transformed from 0.75 to (0.75/1.75)*25%=10.71%, as shown in row 458. Component 308 performs the transformation and normalization computations for the Sales values and the Preference values in rows 454 and 456 in table 452 in a similar manner. The total percent value of a dimension is a sum of all the percentages of all dimension members in that dimension.

Component 308 further computes the relative percentages for each possible multidimensional combination.

Using the example data in table 452, the combination of Large, Blue, 16 GB phones using percentage values of Sales in column 462 is a product of each dimension member that participates in that multidimensional combination, i.e., % of Large sales % of Blue sales % of 16 GB sales:

64.10%*25.81%*10.71%=1.77%

In a similar manner, component 308 computes the Preference percentage value in column 464 for the combination of Large Green 32 GB phones as:

20.18%*25.00%*3.75%=0.19%

Again, the sum of all Sales or Preference percentages in columns 462 or 464, respectively, is 100%.

Component 310 uses the computed percentages for all multidimensional combinations to accommodate exclusions, i.e., combinations that have to be excluded from the possible multidimensional combinations. As an example, assume that Large Green phones may not have 32 GB of Memory as a possible add-on. Using the percentages in table 472, component 310 eliminates one row from table 472—the row that corresponds to Large Green 32 GB multidimensional combination. The value of Sales is 5.91% and Preference is 0.19% for this combination.

Because all percentages in columns 462 and 464 must add up to 100%, component 310 adjusts all other percentages in all remaining rows in table 472 after the removal of the row corresponding to Large Green 32 GB combination. As an example, consider the Large Blue 16 GB combination, whose sales and Preference percentages have to be adjusted because Large Green 32 GB combination is being excluded.

Large Blue 16 GB phones are 1.77% of 100% total for Sales without any exclusions. Therefore, component 310 adjusts 1.77% value by adding to it 1.77% 5.91%, i.e., the Large Blue 16 GB phone's proportion of 5.91% which is removed:

0.0177*0.0591=0.00104607

0.0177+0.00104607=0.01874607 (1.87%)

Other values of Sales and preference percentages of the remaining multidimensional combinations are adjusted in a similar manner.

If multiple combinations are to be excluded, the removed value is a sum of the values of the removed combinations, and the removed total is distributed proportionately among all remaining values. For example, if the Large Green 16 GB phones were to be excluded as well, component 310 would remove 5.91%+0.4.43%=10.34%. The adjustment to Large Blue 16 GB combination would be:

0.0177*0.1034=0.00183018

0.0177+0.00183018=0.01953018 (1.95%)

Application 302 outputs set 312 of generated values for the possible multidimensional combinations after any exclusions have been applied. Component 314 produces one or more analytic views from set 312. For example, suppose a manufacturer wanted to identify a phone model that would be the best seller among all possible multidimensional combinations. Using set 312, and analytics engine 306, component 314 identifies the Large Green None memory combination with a computed normalized sales value of 31.02%, which is the highest computed sales value for any combination. As another example, suppose that the manufacturer wanted to identify a phone model that would be the worst seller among all possible multidimensional combinations. Using set 312, and analytics engine 306, component 314 identifies the Small Orange 16 GB combination with a computed normalized sales value of 0.04%, which is the lowest computed sales value for any combination.

Similarly, component 314 and analytics engine 306 would identify the Medium Orange 16 GB combination as the best preferred, with 4.06% computed preference value, which is the highest computed preference value for any combination. Component 314 and analytics engine 306 would identify the Large Blue 32 GB combination as the least preferred, with 0.13% computed preference value, which is the lowest computed preference value for any combination. A result of an analysis is produced as output 316.

Component 318 sends control command 320, or causes control command 320 to be sent from another system to a control component. For example, if an analysis result identifies the Medium Orange 16 GB combination as the best preferred, control command 320 directs a manufacturing process to increase a production of the Medium Orange 16 GB combination. If the analysis result identifies the Large Blue 32 GB combination as the least preferred, control command 320 directs a supply chain process to decrease the parts supply for the Large Blue 32 GB combination.

These examples of analyses, analytical operations, and control commands are not intended to be limiting. From this disclosure, those of ordinary skill in the art will be able to conceive many other analyses, analytical operations, and control commands, and the same are contemplated within the scope of the illustrative embodiments.

Figure 5:
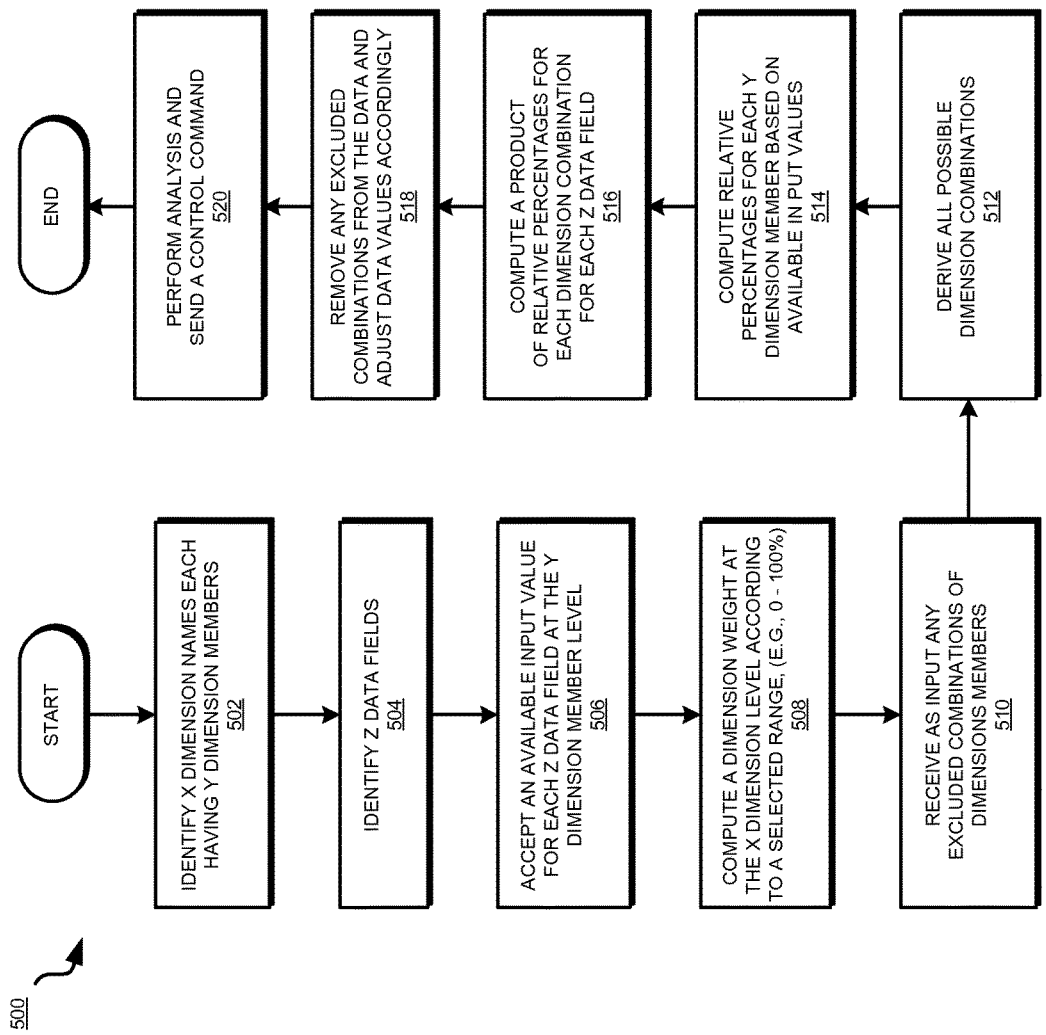
FIG. 5 depicts a flowchart of an example process for generating multidimensional combination data in accordance with an illustrative embodiment.

With reference to FIG. 5, this figure depicts a flowchart of an example process for generating multidimensional combination data in accordance with an illustrative embodiment. Process 500 can be implemented in application 302 in FIG. 3.

The application identifies a set of dimensions, each dimension in the set having a set of dimension members (block 502). The application further identifies a set of data fields, where the set of data fields is applicable to each dimension member in the set of dimension members and to all dimensions related to the object (block 504). A data field holds a specific value for a dimension member.

The application accepts an available input value for each data field for each dimension member (block 506). The application accepts an available input value representing a dimension weight according to a selected range, e.g., 0-100% (block 508). The application receives as input any excluded combinations of dimension members (block 510).

The application derives all possible dimension member combinations (block 512). The application computes relative percentages for each dimension member based on the available input values (block 514). The Application computes a set of products (multiplication), each product being of the relative percentages of each dimension member participating in a particular multidimensional combination (block 516).

The application removes a subset of products from the set computed in block 516 (block 518). A removed product corresponds to an excluded combination. The application adjusts the products in the remaining subset of products to ensure that the sum of the remaining product values of a type remains 100%.

The application performs an analysis of the remaining subset of adjusted products, and sends a control command to cause a change to occur in a manufacturing or data processing environment (block 520). The application ends process 500 thereafter.

Thus, a computer implemented method, system or apparatus, and computer program product are provided in the illustrative embodiments for generating multidimensional combination data. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    determining that a manufactured product produced by a manufacturing facility has a set of values corresponding to a set of data fields, the set of data fields being associated with a dimension member in a set of dimension members, the set of dimension members corresponding to a dimension in a set of dimensions;
    computing, using a processor and a memory, a set of possible combinations of dimension members, a possible combination of dimension members corresponding to an unmanufactured product in a set of unmanufactured products;
    computing, for a data field in the set of data fields of a dimension member in the set of dimension members of a dimension in the set of dimensions, a normalized value based on values of the data field for each dimension member in the dimension;
    computing a combined data field value for the possible combination, wherein the combined data field value is a function of the normalized value of the data field in each dimension member that participates in the possible combination;
    analyzing a set of combined data field values corresponding to the possible combination, to identify a property of the unmanufactured product; and
    adjusting a control component in the manufacturing facility according to the possible combination, the adjusting causing a manufacture of the unmanufactured product with the property.

2. The method of claim 1, further comprising:
    selecting, from the set of possible combinations, a selected combination, the selected combination being identified for exclusion;
    determining a combined data field value of the selected combination; and
    distributing the combined data field value of the selected combination by proportionately adjusting each combined data field value of remaining possible combinations.

3. The method of claim 1, further comprising:
    determining that a dimension member is absent in the set of dimension members of the dimension;
    determining a weight of the dimension based on the absent dimension member; and
    computing the normalized value using the weight.

4. The method of claim 1, wherein the normalized value is a percentage based on a ratio of the value of the data field over a sum of the values of the data field of each dimension member in the dimension.

5. The method of claim 1, further comprising:
    identifying, for the unmanufactured product, the set of dimensions, the set of dimension members for each dimension in the set of dimensions, and the set of data fields for each dimension member in the set of dimension members.

6. The method of claim 1, wherein the set of available values relates to some but not all combinations of dimension members for the unmanufactured product.

7. The method of claim 1, wherein the set of available values is a result of a survey, the survey relating to some but not all combinations of dimension members for the unmanufactured product.

8. The method of claim 1, wherein the method is embodied in a computer program product comprising one or more computer-readable storage devices and computer-readable program instructions which are stored on the one or more computer-readable storage devices and executed by one or more processors.

9. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

10. A computer program product comprising one or more computer-readable storage devices, and program instructions stored on at least one of the one or more storage devices, the stored program instructions comprising:
    program instructions to determine that a manufactured product produced by a manufacturing facility has a set of values corresponding to a set of data fields, the set of data fields being associated with a dimension member in a set of dimension members, the set of dimension members corresponding to a dimension in a set of dimensions;
    program instructions to compute, using a processor and a memory, a set of possible combinations of dimension members, a possible combination of dimension members corresponding to an unmanufactured product in a set of unmanufactured products;
    program instructions to compute, for a data field in the set of data fields of a dimension member in the set of dimension members of a dimension in the set of dimensions, a normalized value based on values of the data field for each dimension member in the dimension;

program instructions to compute a combined data field value for the possible combination, wherein the combined data field value is a function of the normalized value of the data field in each dimension member that participates in the possible combination;

program instructions to analyze a set of combined data field values corresponding to the possible combination, to identify a property of the unmanufactured product; and program instructions to adjust a control component in the manufacturing facility according to the possible combination, the adjusting causing a manufacture of the unmanufactured product with the property.

11. The computer program product of claim 10, the stored program instructions further comprising:

program instructions to select, from the set of possible combinations, a selected combination, the selected combination being identified for exclusion;

program instructions to determine a combined data field value of the selected combination; and program instructions to distribute the combined data field value of the selected combination by proportionately adjusting each combined data field value of remaining possible combinations.

12. The computer program product of claim 10, the stored program instructions further comprising:

program instructions to determine that a dimension member is absent in the set of dimension members of the dimension;

program instructions to determine a weight of the dimension based on the absent dimension member; and program instructions to compute the normalized value using the weight.

13. The computer program product of claim 10, wherein the normalized value is a percentage based on a ratio of the value of the data field over a sum of the values of the data field of each dimension member in the dimension.

14. The computer program product of claim 10, the stored program instructions further comprising:

program instructions to identify, for the unmanufactured product, the set of dimensions, the set of dimension members for each dimension in the set of dimensions, and the set of data fields for each dimension member in the set of dimension members.

15. The computer program product of claim 10, wherein the set of available values relates to some but not all combinations of dimension members for the unmanufactured product.

16. The computer program product of claim 10, wherein the set of available values is a result of a survey, the survey relating to some but not all combinations of dimension members for the unmanufactured product.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine that a manufactured product produced by a manufacturing facility has a set of values corresponding to a set of data fields, the set of data fields being associated with a dimension member in a set of dimension members, the set of dimension members corresponding to a dimension in a set of dimensions;

program instructions to compute, using a processor and a memory, a set of possible combinations of dimension members, a possible combination of dimension members corresponding to an unmanufactured product in a set of unmanufactured products;

program instructions to compute, for a data field in the set of data fields of a dimension member in the set of dimension members of a dimension in the set of dimensions, a normalized value based on values of the data field for each dimension member in the dimension;

program instructions to compute a combined data field value for the possible combination, wherein the combined data field value is a function of the normalized value of the data field in each dimension member that participates in the possible combination;

program instructions to analyze a set of combined data field values corresponding to the possible combination, to identify a property of the unmanufactured product; and program instructions to adjust a control component in the manufacturing facility according to the possible combination, the adjusting causing a manufacture of the unmanufactured product with the property.

18. The computer system of claim 17, the stored program instructions further comprising:

program instructions to select, from the set of possible combinations, a selected combination, the selected combination being identified for exclusion;

program instructions to determine a combined data field value of the selected combination; and program instructions to distribute the combined data field value of the selected combination by proportionately adjusting each combined data field value of remaining possible combinations.

19. The computer system of claim 17, the stored program instructions further comprising:

program instructions to determine that a dimension member is absent in the set of dimension members of the dimension;

program instructions to determine a weight of the dimension based on the absent dimension member; and program instructions to compute the normalized value using the weight.

20. The computer system of claim 17, wherein the normalized value is a percentage based on a ratio of the value of the data field over a sum of the values of the data field of each dimension member in the dimension.

* * * * *